United States Patent
Ringer et al.

(10) Patent No.: US 10,576,318 B1
(45) Date of Patent: Mar. 3, 2020

(54) DIFFERENTIAL FLOW DETECTOR FOR FIREFIGHTING SYSTEMS

(71) Applicant: Globe Fire Sprinkler Corporation, Standish, MI (US)

(72) Inventors: Yoram Ringer, Providence, RI (US); Thomas Edwin Archibald, Midland, MI (US); Brian Dean Spicer, Standish, MI (US)

(73) Assignee: Victaulic Company, Easton, PA (US)

( * ) Notice: Subject to any disclaimer, the term of this patent is extended or adjusted under 35 U.S.C. 154(b) by 0 days.

(21) Appl. No.: 16/045,686

(22) Filed: Jul. 25, 2018

Related U.S. Application Data

(60) Provisional application No. 62/538,399, filed on Jul. 28, 2017.

(51) Int. Cl.
*A62C 35/68* (2006.01)
*G01F 1/34* (2006.01)
*A62C 37/42* (2006.01)
*G01M 3/28* (2006.01)
*A62C 37/40* (2006.01)

(52) U.S. Cl.
CPC ............. *A62C 35/68* (2013.01); *A62C 37/40* (2013.01); *A62C 37/42* (2013.01); *G01F 1/34* (2013.01); *G01M 3/2815* (2013.01)

(58) Field of Classification Search
CPC ......... A62C 35/68; A62C 37/40; A62C 37/42; G01F 1/34; G01M 3/2815
USPC ...................................................... 340/611
See application file for complete search history.

(56) References Cited

U.S. PATENT DOCUMENTS

| | | | |
|---|---|---|---|
| 2,873,606 A | 2/1959 | Ekstrom | |
| 4,221,134 A | 9/1980 | Ekstrom | |
| 5,168,200 A | 12/1992 | Payne | |
| 5,461,932 A | 10/1995 | Hall et al. | |
| 6,084,521 A | 6/2000 | Ha | |
| 6,239,446 B1 | 5/2001 | Cholin | |
| 6,275,160 B1 | 8/2001 | Ha | |
| 6,331,820 B1 | 12/2001 | Borbath | |
| 6,333,695 B2 * | 12/2001 | Young | G01F 1/363 340/606 |
| 6,568,416 B2 * | 5/2003 | Tucker | G05D 16/2053 137/14 |
| 6,601,460 B1 | 8/2003 | Materna | |
| 6,741,179 B2 * | 5/2004 | Young | G01F 1/26 340/606 |
| 6,953,189 B2 | 8/2005 | Richards | |
| 7,237,568 B2 | 7/2007 | Cooper | |
| 7,367,241 B2 | 5/2008 | Ohmi et al. | |
| 8,264,361 B2 | 9/2012 | Struyk | |
| 8,678,025 B2 * | 3/2014 | Kitt | F16K 17/30 137/102 |
| 8,749,393 B1 * | 6/2014 | Tollefson | G01M 3/2815 340/605 |
| 8,939,428 B2 * | 1/2015 | Laverdiere | G05D 16/2013 251/61.2 |
| 9,500,503 B2 | 11/2016 | Igarashi | |

(Continued)

*Primary Examiner* — John A Tweel, Jr.
(74) *Attorney, Agent, or Firm* — Shalom Wertsberger; Saltamar Innovations

(57) ABSTRACT

A flow switch for a firefighting system is disclosed, providing high reliability and low fluid flow resistance impact. The switch utilizes pressure drop across a valve, which is commonly already required in the firefighting system. Optionally pressure drop across a check valve is utilized.

19 Claims, 11 Drawing Sheets

(56) References Cited

U.S. PATENT DOCUMENTS

| | | |
|---|---|---|
| 2013/0008542 A1* | 1/2013 | Irwin .................... F16K 31/402 137/859 |
| 2017/0113083 A1 | 4/2017 | Ringer et al. |
| 2017/0146133 A1 | 5/2017 | Archibald et al. |
| 2017/0326394 A1 | 11/2017 | Ringer et al. |
| 2018/0043197 A1 | 2/2018 | Ringer et al. |

* cited by examiner

DIFFERENTIAL FLOW DETECTOR FOR FIREFIGHTING SYSTEMS

TECHNICAL FIELD

The present invention is directed generally to improvements in firefighting systems, and more particularly to devices and methods for sensing fluid flow in such systems.

BACKGROUND

The field of fire protection is of extreme importance to life and equipment. Firefighting system design presents many challenges to the designer including a need to optimize the effectiveness of the fire protection equipment while at the same time minimizing the cost of installation. Improving fire protection calls for rapid delivery of fire suppression fluid such as water, foam, or gas, to overcome fires. Fires grow rapidly and therefore methods to achieve early fire suppression can significantly reduce overall installation costs by minimizing the scale of the system needed to suppress the fire. Rapid delivery design requirements can drive a need for large pipe and valve diameters, and/or a need for high operating pressures to accelerate fluid delivery. Clearly, high reliability is of-course of high importance.

The most common sprinkler systems utilize water as fire suppressant as in many locations water supply is available at sufficiently high pressure and volume, often from public distribution mains. Thus the present specifications will utilize the term 'water' as equivalent shorthand to any relevant primary fire suppressant fluid, by way of non-limiting example.

Sprinkler systems are standardized nowadays to deliver the fire suppression fluid to the needed sites. Sprinkler systems comprise a fluid distribution system, having pipes that communicates fluid to a plurality of individual sprinklers. The sprinklers act as heat sensitive elements as well as fire suppressant fluid outlets. In certain sprinkler systems commonly known as wet systems, fluid, such as water, is present at the sprinkler. As the heat caused by the fire is the reason of the activation of the sprinkler, the systems delivers fire suppressant from at least one sprinkler near the fire relatively rapidly, namely as soon as the sprinkler acting as a heat sensing elements is activated.

Certain implementations of sprinkler systems, such as outdoor systems in cold geographical locations or cold storage facilities by way of example, present freezing risk if the water are kept in the distribution system. To resolve this problem many sprinkler systems are dry —water is introduced to the system only in case of detection of fire. Controlling the introduction of the water is done by a control valve.

Both wet and dry sprinkler systems utilize other valves as well—a shutoff valve is utilized to control introduction of water to the system as a whole for purposes of construction and maintenance, for handling leaks, and of-course after a fire system is activated and the fire is extinguished, to allow stopping of water flow, and bringing the system back to operational state.

Wet sprinkler systems commonly utilize a check valve to maintain water in the distribution system which may otherwise vary due to pressure and temperature fluctuations. Most common check valves in such systems utilize a movable sealing element colloquially known as a clapper, sealing against a seat. The seat and sealing member interface defines a sealing port of the valve. The pressure differential on both sides of the clapper is relatively small, and check valves commonly have similar areas on both sides of the clapper exposed to the fluid. Check valves often use gravity, springs or and the like to urge the clapper to a closed state and allow flow only in one direction.

Check valves are also used in different portions of the distribution system to protect specific zones such as differing floors in multi-floor buildings, differing zones of warehouses, and the like.

Clappers are also commonly utilized in "dry pipe" system control valves. Dry pipe sprinkler systems control introduction of water by having a fluid such as compressed gas in the distribution system, however the gas pressure is far lower than the water pressure. A control valve is equipped with a clapper and is constructed such that a larger area of the clapper is exposed to gas pressure than the area exposed to water pressure. This provides a mechanical advantage which maintain the control valve closed. Subsequent to a sprinkler activation, gas is released from the distribution system, the gas pressure drops and the water pressure is sufficient to overcome the gas pressure and water are introduced to fight the distribution system.

In a fire fighting system the flow resistance presented by any component may be critical to the system performance, and this extends to check valves—while flow resistance of the check valve is important in many applications, it is a critical consideration in firefighting systems.

Sensing the existence of fire, and promptly alerting personnel thereof is highly important to provide personal security and to minimize property damage. To that end flow sensors are often utilized to provide an indication of flow resulting from activation of at least one sprinkler. In certain cases flow detection may be utilized for additional purposes, such as activating a pump, and the like. Flow detection may take place relevant to primary fluid flow, such as the water, and/or to a secondary fluid such as the compressed gas. Detecting flow of primary, and/or in certain cases detecting flow of secondary fluid flow, activates alarms in various firefighting system arrangements. If a flow detector acts as a switch to activate an alarm or otherwise report system activation when even a single sprinkler trips, appropriate personnel may take action to evacuate an area and take other actions to mitigate the fire effects. While these specifications use, by way of convenient example water based wet system it is noted that all firefighting system types, including various dry systems known as deluge, dry pilot, wet pilot, and the like, may benefit from flow detection, for activating alarm, for testing, for activating a booster pump, and the like.

However, experience shows that flow may sometimes exist for a short period, due to transient effects of pressure and/or temperature, without true occurrence of a fire. In order to minimize false alarms resulting from such transient variations flow switches in firefighting systems often utilize timing devices to delay the onset of the alarm for a predetermined period.

Flow sensors are known in the art, and are primarily embodied in a paddle or a vane. By way of example U.S. Pat. No. 2,873,606 to Ekstrom, presents one flow detector however it is often considered too restrictive for firefighting purposes. U.S. Pat. No. 6,239,446 to Cholin is but one example disclosing a flow detector utilizing a paddle disposed in the firefighting system riser to detect fluid flow. One problem with paddle or vane based systems is that they require placing a flow disturbance in the main fluid line. Furthermore, the detector must be sufficiently sensitive to detect relatively small flow, such as may be caused by a single sprinkler in a riser having a cross section area which is a large multiple of the cross section surface of the orifice of the sprinkler. This requires large paddle surface relative to the riser size, as well as minimal resistance to the vane movement which is transmitted outside the riser. Producing such minimal resistance makes sealing the point where the paddle leaves the riser a weakness point. Furthermore, the paddle solution mandates specific size paddle for each riser size, and commonly further requires drilling a hole into the riser, all of which increases stock requirements, complexity and cost. Additionally, in order to increase the sensitivity of the flow sensor to low flow, the paddle is oftentimes made of light, low strength material. Such paddle or portions thereof may be torn from the flow sensor during the full flow condition caused by large fire, and drift to a portion of the distribution system where they may block water flow at the most critical time.

Differential fluid detectors are also known. Such flow detectors are based on measuring fluid pressure on two sides of a restriction placed in fluid path. By way of example, U.S. Pat. No. 4,221,134 provides for fluid flow measurement utilizing such a restriction. However again, such devices are considered inappropriate for firefighting systems, as they restrict flow therethrough. It is a common and clearly understood requirement for a firefighting system to minimize fluid flow restrictions as a large fire requires as much of the firefighting fluid available in the shortest possible period.

It is seen that the design of a fire suppression system such as sprinkler systems benefits from reliable flow detection of relatively small amounts of fluid relative to the total system capacity or even to the downstream portion of the system from the fluid flow detector. There is therefore an ongoing need for a simple, reliable, and sufficiently sensitive fluid flow detection methods and devices in such firefighting systems, while minimizing flow restriction during system activation.

SUMMARY

It is therefore an object of the present invention to provide fluid flow detection devices and methods tending to the unique nature of firefighting systems, which will overcome the shortcomings of the known art. Certain other objects of aspects of the invention include providing a flow detection method and devices which may be operated over a large variety of riser sizes, and providing the methods and devices which assert an electrical signal when fluid flow exceeds a predetermined level. In certain embodiments of the invention it is an object of the invention to allow programmability of the predetermined fluid flow amount relative to the riser size. A further optional object includes adding a delay prior to asserting electrical signal indicating fire, the delay optionally being variable. Other optional features and objects will be clear in view of the present disclosure.

As described above, firefighting systems have at least one, and oftentimes a plurality of valves. While valves perform primarily the function of flow control, valves generally also have a pressure differential between their input and output when fluid flows therethrough. Important aspects of the invention utilize this pressure differential to detect fluid flow. Notably check valves tend to exhibit sharper pressure drop at relatively low flow rate as the fluid must act against the clapper and often also against a spring, while when flow through the check valve is high or full, the forces required to keep the clapper from sealing are negligible, and so is the resulting pressure differential. It is noted however that any valve with sufficient pressure drop such that the differential may be sensed in the required operating environment of a firefighting system may be utilized as a fluid flow switch under the principles disclosed in these specifications. So an important aspect of the invention involves utilizing pressure differential which develop as a result of fluid flow across a valve installed in a firefighting system. The valve is oftentimes a check valve.

Therefore, in an aspect of the invention, there is provided flow detection device operative in a firefighting system having at least one valve with an inlet for coupling to a fluid supply and an outlet for coupling to a fluid distribution system, the valve having a body defining a fluid path between the input and the output and a sealing element disposed in the fluid path for controlling fluid flow from the inlet to the outlet, the device further comprising a supply pressure chamber in fluid coupling with the valve inlet; a distribution pressure chamber in fluid coupling with the valve outlet; a pressure sensing member coupled to the supply and distribution pressure chambers, and operative to sense pressure differences therebetween; and an indication device coupled to the pressure sensing member and operative to provide an indication when a pressure differential between the supply and distribution pressure chambers exceeds a predetermined level. Commonly, the indicating device is operative to assert an electrical signal in response to the pressure differential exceeding the predetermined level, and not assert the signal if the pressure differential does not exceed the predetermined level. It is noted that the pressure differential commensurate with a flow level during low flow conditions. Commonly the valve is a check valve.

Asserting the signal may be by setting an electrical wire to a certain level, such as indicating a logic level or an analog voltage or current level, by closing or opening one or more circuits, by transmitting information to a remote station via a wire or wirelessly and the like. In some embodiments the electrical signal is indicative of the sensed flow level, and in other embodiments assertion simply indicates that the predetermined level of pressure difference was exceeded. Such electrical signal may be utilized for activating an alarm, for system control purposes, for providing notification to firefighting or other security personnel, and the like, including any combination thereof. It is noted that asserting a signal implies taking an action that would indicate the existence of flow through the valve exceeding the predetermined level. In contrast, not asserting the signal may imply setting voltage or current to a level which indicate that no flow or flow below the predetermined level. Not asserting may also imply not taking an action, such as not transmitting information indicating flow exceeding the predetermined level, or sending flow information that indicates lower flow level than the predetermined level.

Optionally, the device further comprises a delay mechanism operative to assert the electrical signal only if the pressure differential exceeds the predetermined level for a predetermined delay period. If the pressure differential does not exceed the predetermined level and/or does not exceed the pressure difference for at least the predetermined delay period the device does not assert the electrical signal. Further optionally the predetermined period and/or the predetermined level are adjustable.

In certain embodiments the indication device is further operative to assert the electrical signal of the delay mechanism or a second electrical signal, if the pressure differential exceeds a second, higher predetermined flow level. While in most cases the predetermined flow level is set to commensurate with the activation of a single sprinkler, such second flow level is caused by activation of a plurality of sprinklers, and thus indicative of greater fire. If a delay is utilized, the indicating mechanism may bypass the delay in response to such second flow level, and assert the electrical signal without delay. Alternatively, the indicating device may assert a second electrical signal, in addition to the delayed first signal. Such detection of flow of the second level or above may be utilized to form an alarm or another indication that higher urgency flow exists.

The pressure sensitive member may be embodied in several manners. In one type of embodiments, the pressure sensitive member comprises a piston or a diaphragm being exposed on one side thereof to supply pressure and the opposite side thereof to distribution pressure. By way of example, such piston or diaphragm may be disposed between the supply and distribution pressure chambers and coupled to the indication device. As the diaphragm or the piston are exposed to pressure from both the pressure chambers, pressure difference therebetween urges the piston or diaphragm to move in at least a direction and potentially also in an amplitude indicative of the pressure difference. A switch or a transducer may be coupled to the piston or diaphragm in order to provide the electrical signal, directly or indirectly. By way of example the position of the piston or diaphragm may be sensed mechanically such as by a lever or rod coupled to thereto, electrically such as by inductive or capacitive coupling, magnetically, electro-optically, acoustically, and the like. Notably the piston or diaphragm may divide a signal cavity into the supply and distribution chambers respectively, and such piston or diaphragm may move, to change the relative volume of the respective pressure chambers.

In other embodiments the pressure sensing member comprises an electronic pressure transducer disposed between the supply and distribution pressure chambers, and measuring pressure difference therebetween. Differential pressure sensors are known where a transducer responds directly to pressure difference between two of its sides. Such transducer utilize any common sensing transducer, such as resistive, capacitive, strain based, vibrating wire, piezoelectric, MEMS (Micro-Electro-Mechanical System) transducer, and the like, including combinations of such sensors and transducers. The transducer generally comprises at least two pressure sensing surfaces, one of the surfaces being exposed to the valve inlet pressure and the other to the valve outlet pressure, or stated differently, one surface is exposed to supply pressure while the other surface is exposed to the distribution pressure, each on respective sides of the valve.

In yet other embodiments, the pressure sensing member comprises at least a first pressure transducer coupled to the valve inlet pressure, i.e. the supply pressure, and at least a second pressure transducer coupled to the valve outlet pressure, i.e. to the distribution pressure, wherein the indicating device measures the pressure between the first and second pressure transducers, wherein the predetermined level is measured at least as the difference between the pressure sensed by the first transducer and the second transducer.

Optionally, in such embodiments the first or the second or both transducers may be utilized to indicate the presence of sufficient pressure, and to activate a third electrical signal to be communicated to maintenance personnel indicating a potential firefighting system malfunction.

In some embodiments the valve is a check valve. In other embodiments the valve may be a shutoff valve, a control valve, and the like.

Further optionally, the valve may integrate the function of a shutoff valve and a check valve, a control valve and a check valve, or a combination thereof.

In some embodiments the valve may comprise a plurality of valves of varying types, coupled in series to each other. Such embodiments relate to the plurality of valves as a single valve. Stated differently, the plurality of valves is considered as having the valve inlet at the inlet of the upstream-most valve, and the supply pressure is the pressure substantially at that inlet. The plurality of valves is considered as having the valve outlet at the outlet of the downstream-most valve, and the distribution pressure is the pressure substantially at the outlet. In certain embodiments utilizing a plurality of valves the fluid coupling between the supply chamber and the valve inlet, and the fluid coupling between the distribution chamber and the valve outlet may be embodied in any portion of the series of the valves on both sides of at least one valve.

It is important to note that pressure coupling may be achieved via one or more intermediate components, such as pipes, conduits, and the like. By way of example, coupling of inlet pressure to the supply pressure chamber may be achieved by coupling the supply pressure chamber to a pipe coupled to the valve inlet, where the pressure is substantially similar to the pressure at the valve inlet. The coupling of the pressure chamber itself may be accomplished via a plurality of components, which may include valves, pipes, conduits, and the like. As the flow in and out of the pressure chambers is minute relative to the flow required from even a single activated sprinkler, the piping and other components for providing fluid coupling to the pressure chambers, pressure sensors, and the like may be of significantly smaller diameter without a significant effect of the pressure sensing.

In some embodiments the valve is a check valve having a seat disposed in the fluid path between the inlet and the outlet, and a clapper rotatable between a closed position where the clapper acts as a seal against the seat, and an open position where the clapper is rotated away from the seat. In some such embodiments the clapper is equipped with a lip extending into the seat towards the valve inlet when the check valve is in the closed position, to increase pressure differential at low flow rates.

In another aspect of the invention there is provided a method for detecting fluid flow in a firefighting system having at least a valve with an inlet and an outlet, the method comprising the steps of: measuring the pressure of the fluid at the valve inlet to obtain an inlet pressure; measuring the pressure of the fluid at the outlet of the valve to obtain an outlet pressure; comparing the pressure difference between the inlet pressure and the outlet pressure and asserting an electrical signal if the pressure difference exceeds a first predetermined pressure. Optionally the method further comprises the steps of asserting the electrical signal only if the pressure difference between the input and output exceeds the predetermined level for a predetermined time period, and not asserting the electrical signal if the pressure difference does not exceed the predetermined level for the predetermined period. Preferably the predetermined period and/or the predetermined level are adjustable.

Optionally the method further comprising the step of asserting a second electrical signal if the difference between the input pressure and the output pressure exceeds a second predetermined level higher than the first predetermined level.

Preferably the valve performs an additional function in the firefighting system, such function may be required for proper operation of the system or mandated for the firefighting certification.

BRIEF DESCRIPTION OF THE DRAWINGS

Some embodiments of the invention are described herein with reference to the accompanying drawings. The description, together with the figures, enables and makes apparent to a person having ordinary skill in the art how the teachings of the disclosure may be practiced, by way of non-limiting examples. The figures are for the purpose of illustrative discussion and no attempt is made to show structural details of an embodiment in more detail than is necessary for a fundamental and enabling understanding of the disclosure. For the sake of clarity and simplicity, some objects depicted in the figures are not to scale.

DETAILED DESCRIPTION OF EXAMPLE EMBODIMENTS

Figure 1:
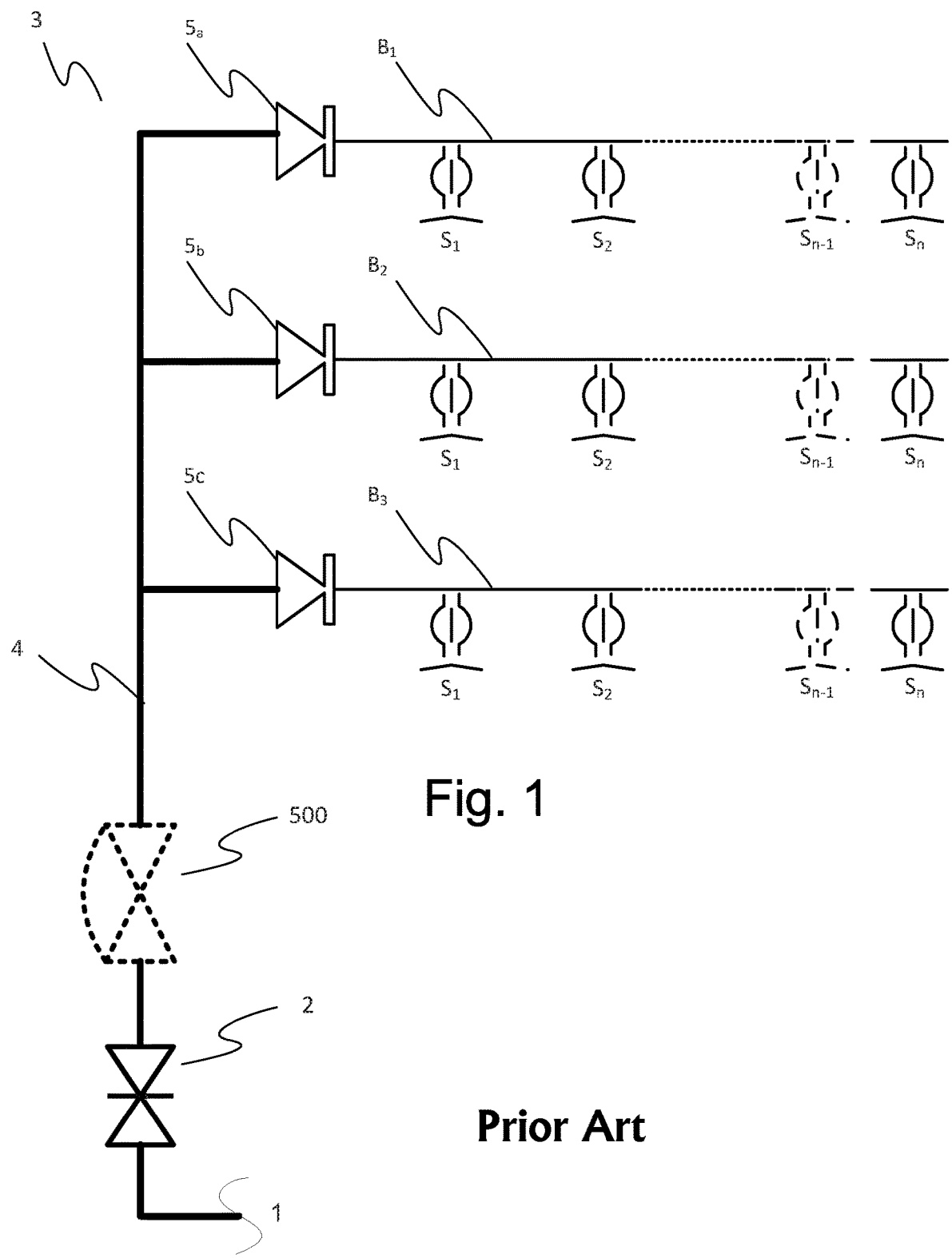
FIG. 1 depicts a simplified schematic diagram of a sprinkler based firefighting system.

FIG. 1 depicts a simplified schematic diagram of a firefighting sprinkler system provided by way of illustrative example only. The system is coupled to a firefighting fluid supply 1 under pressure, commonly water mains. A shutoff valve 2 is installed to control water access to the system. It is noted that a shutoff valve is sometimes referred to as a control valve or a stop valve, these specifications would utilize the term shutoff valve. Various types of shutoff valves are known, such as butterfly valve, gate valve, clapper valve and the like.

In certain systems the shutoff valve 2 is coupled directly to distribution system 3. In other systems optional trim 500 of various kinds is installed between the shutoff valve and the distribution system. The trim 500 is shown as an optional block with broken lines. By way of example trim may include inter alia a dry pipe valve, check valve, test and drain valve, pressure gages, indicators, and the like. Such trim is commonly required by fire codes, and vary according to the applicable standard and system type.

Distribution system 3 commonly comprises a main distribution pipe known colloquially as a riser 4, which may be split to a plurality of branches $B_1, B_2, B_3, \ldots B_m$. Each of the branch comprises a pipe with at least one, but commonly a plurality, of sprinkler heads $S_1, S_2 \ldots S_{n-1}, S_n$. Each of the sprinklers operates both as a heat sensing element, and as a distribution nozzle for the firefighting fluid once the sprinkler is activated. By way of example, branches may be made to different floors or wards of a building, different compartments in an enclosure such as a warehouse, a parking garage, or marine vessel, different storage areas, and the like. Branches extending out of branches are also known.

In many installations branches utilize trim, depicted schematically in FIG. 1 as $5_a$, $5_b$, $5_c$. The branch related trim optionally include equipment to allow isolating the branch from the system by a local shutoff valve which is normally open, a unidirectional flow valve commonly known as check valve, to retain water available at the local branch in case of supply drop in the main riser, a flow detector for activating alarms and the like. One advantage of the branch trim, and most specifically to check valves therein, relate to avoiding the need to drain the whole firefighting system for maintenance of portions thereof.

Figure 1A:
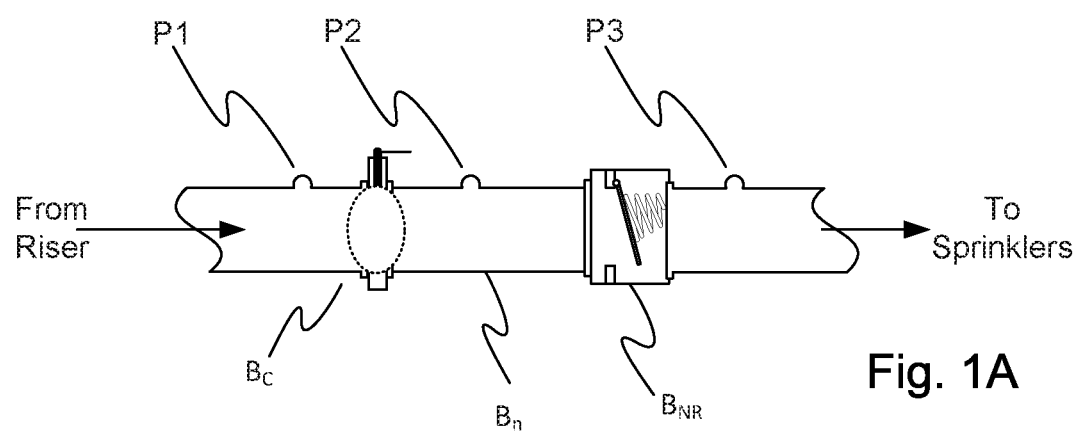
FIG. 1A depicts a simplified trim and valves of a branch in a firefighting system.

FIG. 1A depicts a simplified schematic diagram of branch related trim. Supply water under pressure arrive at a local shutoff valve depicted as a butterfly valve $B_C$. A check valve $B_{NR}$ is coupled to the butterfly valve in series, leading downstream to the sprinkler heads.

In certain embodiments the local shutoff and check valves are integrated. For brevity and clarity, the present specifications will utilize primarily such an integrated shutoff and check valve. Briefly, as seen for example in FIGS. 4 and 6 which present a cross section view of an example of such valve, the valve 50 has a body defining a fluid passage therethrough the fluid passage being divided by a valve seat 55 into an inlet chamber 52 and outlet chamber 57. A clapper 60 is hinged to the valve body and is rotatable between a closed state where it impedes fluid flow between the inlet and the outlet by sealing against the seat, and an open state in which it allows water flow between the inlet and outlet chambers. The clapper 60 may be forced against the seat 55 by a closure member 80 which may be urged against a portion of the clapper, forcing it closed. The closure member allows the valve to act as a combination of check valve and shutoff valve.

Beside a closed state and open state, the valve may be in a standby state. In standby state the closure member 80 being disposed away from the clapper 60, and thus the clapper may move away from the seat to allow fluid flow. However when exposed to pressurized fluid from the supply, and assuming that no sprinkler have been triggered, the firefighting system is in a standby state. Fluid pressure is supplied to the relevant sprinklers, but there is no fluid flow in the system. In the standby state fluid pressures on both sides of the clapper are substantially equal. However, despite the closure member 80 being away from the clapper 60, the clapper is urged against the seat by force of gravity and/or an elastic force such as by a spring 65. If fluid pressure at the inlet chamber 52 is reduced, the fluid pressure at the outlet chamber 57 would urge the clapper even harder against the seat, preventing fluid flow from the outlet to the inlet. If however fluid pressure in the inlet chamber 52 is larger than the fluid pressure in the outlet chamber, the pressure difference would urge the clapper 60 to rotate away from the seat 55 against the spring and/or gravity force, at least until the force applied to the clapper by pressure difference between the inlet and outlet equals the force would overcome the force maintaining the clapper closed.

Thus when the closure member 80 is pressed against the clapper the valve 50 acts as a closed shutoff type valve, while when the closure member is not pressed against the clapper the valve acts as a check valve, allowing flow from the inlet to the outlet but not from the outlet to the inlet.

In the depicted valve an optional test and drain port 70 is also provided. The test and drain may be utilized to test the flow detector device, as opening it would cause fluid to flow across the seat from the inlet to the outlet.

It is noted that as fluid flows from the valve inlet chamber 52 to the outlet chamber 57, it must overcome the weight of the clapper, the spring force, or both. Doing so requires energy that results in a pressure drop, or stated differently in a pressure differential between the inlet and outlet chambers. The pressure differential is relatively large at low-flow rates, however at high flow rates, such as once the clapper is fully opened, the pressure differential becomes negligible as the fluid passage is substantially fully open. A low-flow rate is considered as the flow level caused by a small number, such as one, two or three sprinklers, and commonly less than five percent of the number of sprinklers in the distribution system coupled to the valve, being activated. The number of activated sprinklers resulting in low flow rate may be any desired rate and is a design choice.

In the depicted valve an optional lip 85 extends from the clapper towards the inlet chamber when the clapper is in standby state. The lip 85 increases the distance the clapper moves for a given small fluid flow and thus increases the pressure drop and the resulting pressure differential.

It is again noted however that some flow related pressure differential between a valve inlet and a valve outlet would exist for any common valve in use in a firefighting system, and thus any valve with measurable pressure drop may be utilized with the disclosed fluid flow detector. However the nature of a check valve provides significant advantage due to the need to move the sealing member thereof for even a small flow rate.

Figure 2:
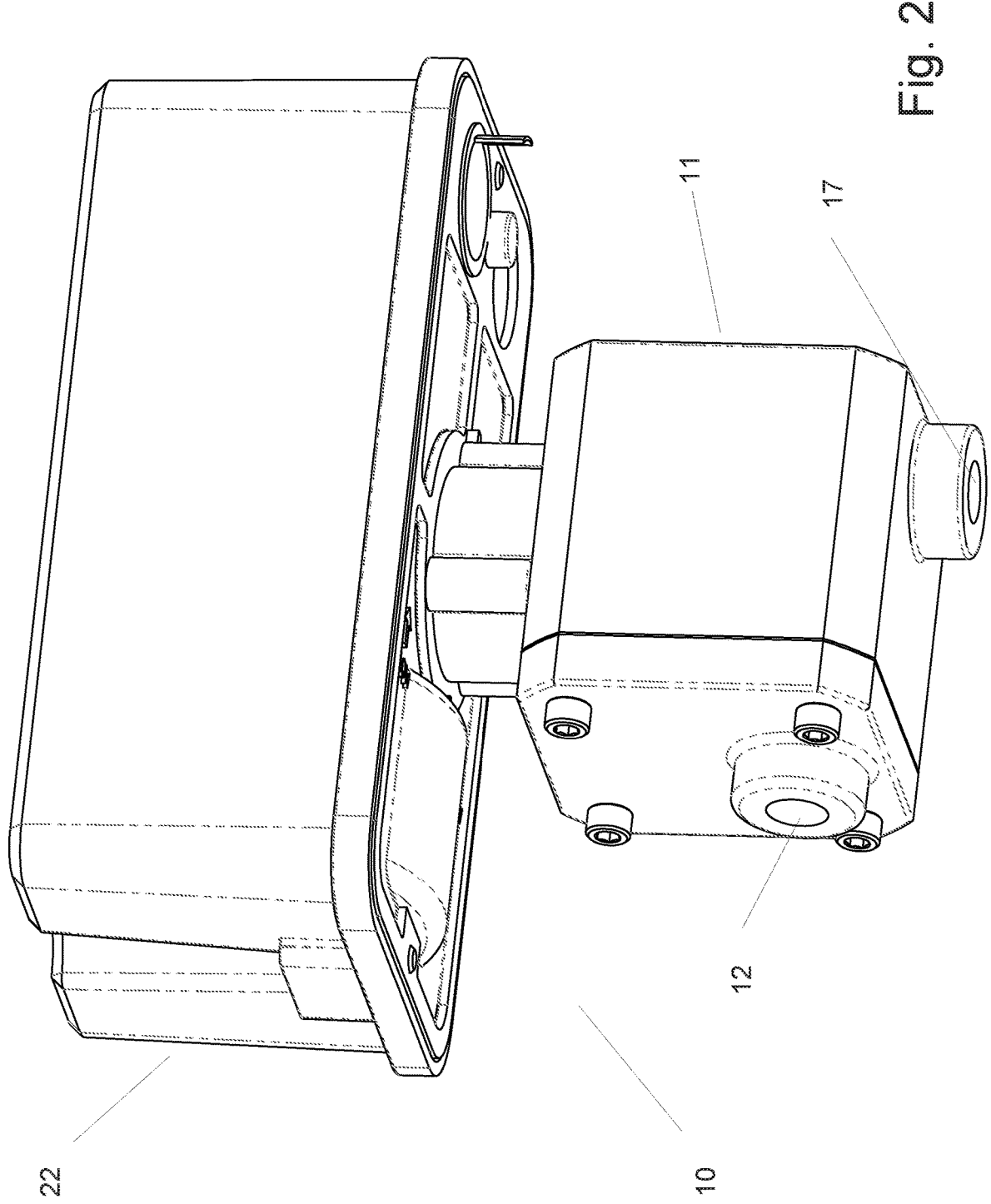
FIG. 2 depicts a general perspective outside view of a flow detection device according to an aspect of the invention.
Figure 3:
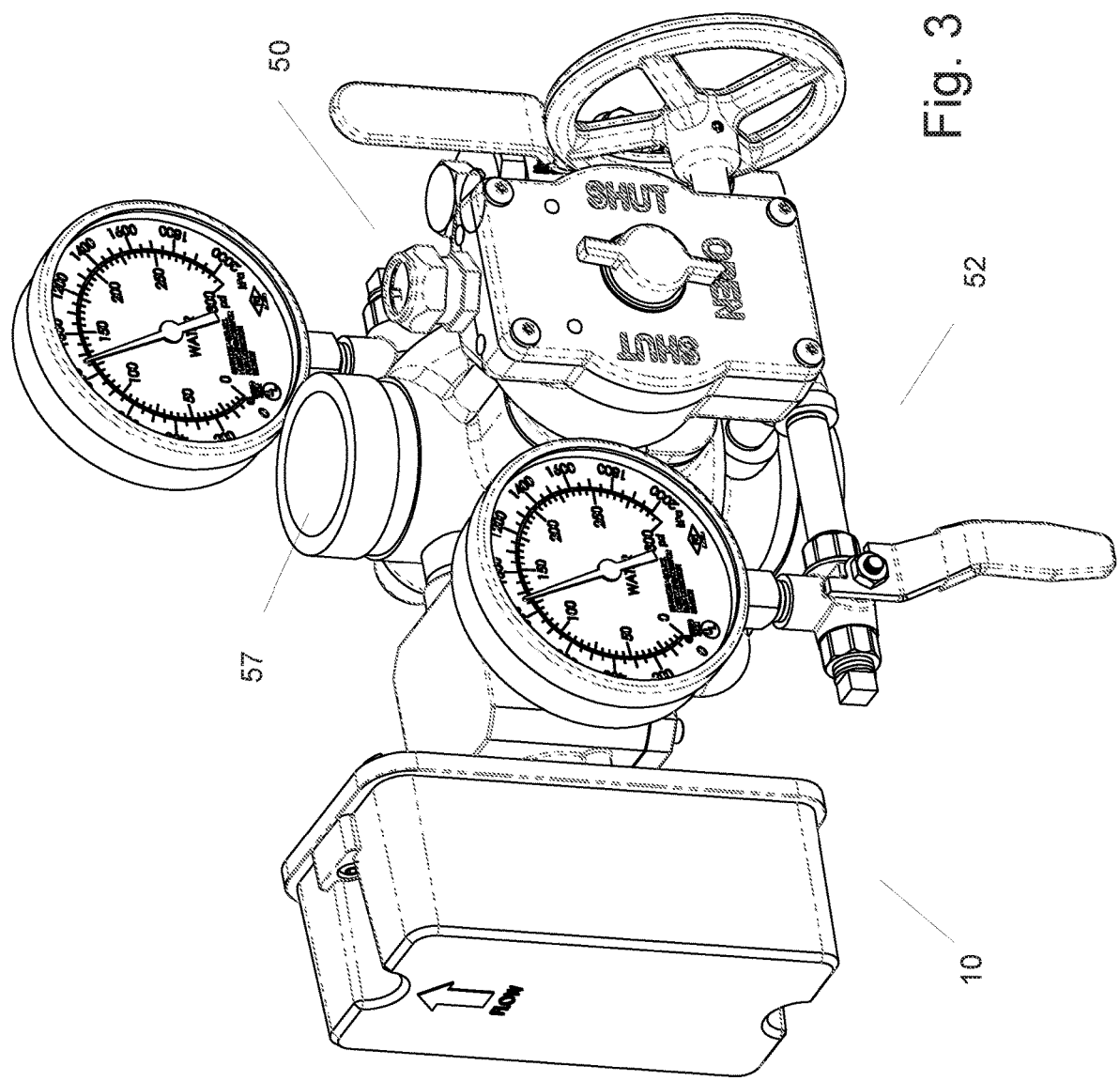
FIG. 3 depicts an example combination shutoff/check valve utilizing the flow detector of FIG. 2.
Figure 5:
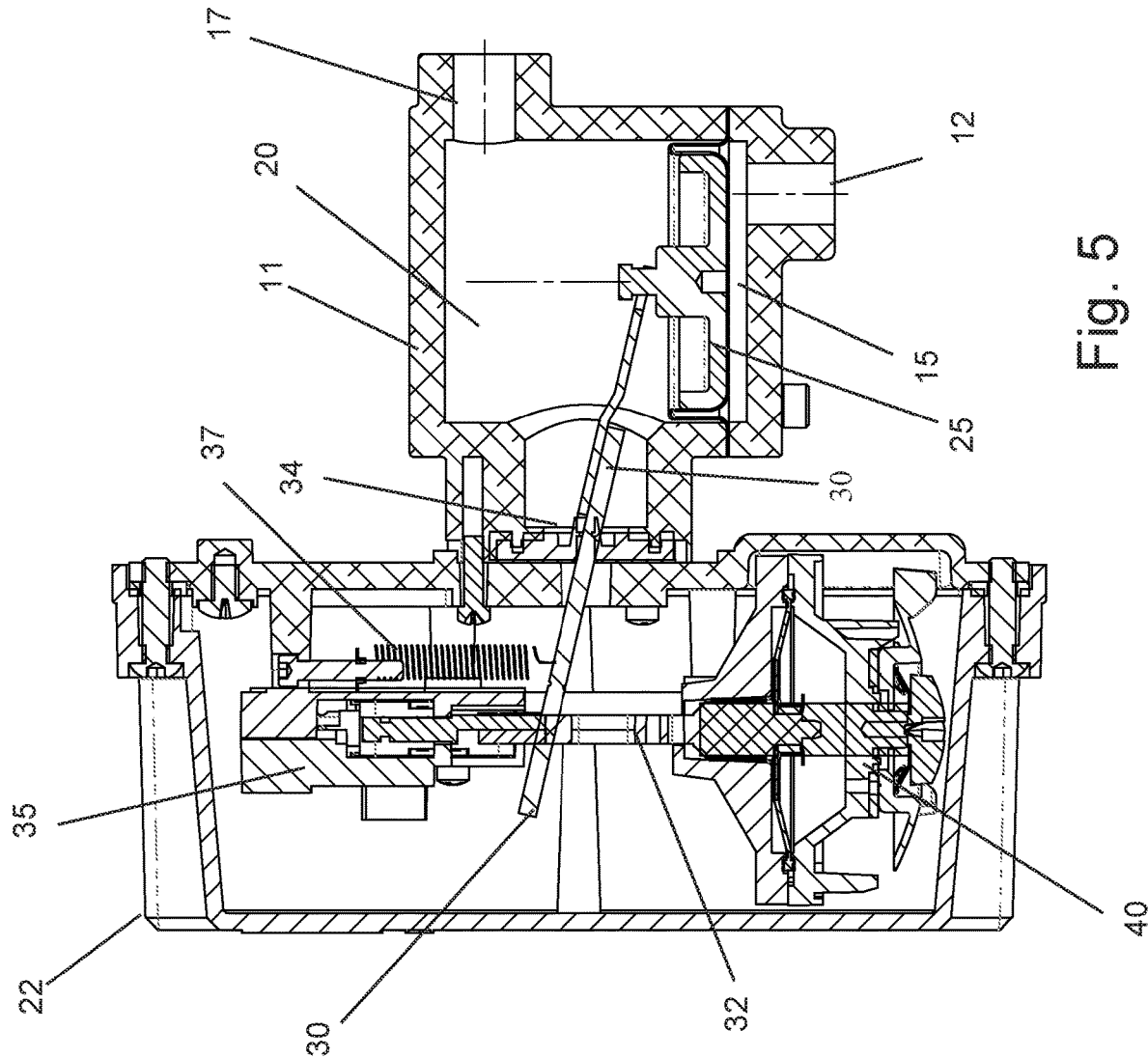
FIG. 5 depicts a cross-section of the flow detection device of FIG. 2 in standby mode
Figure 7:
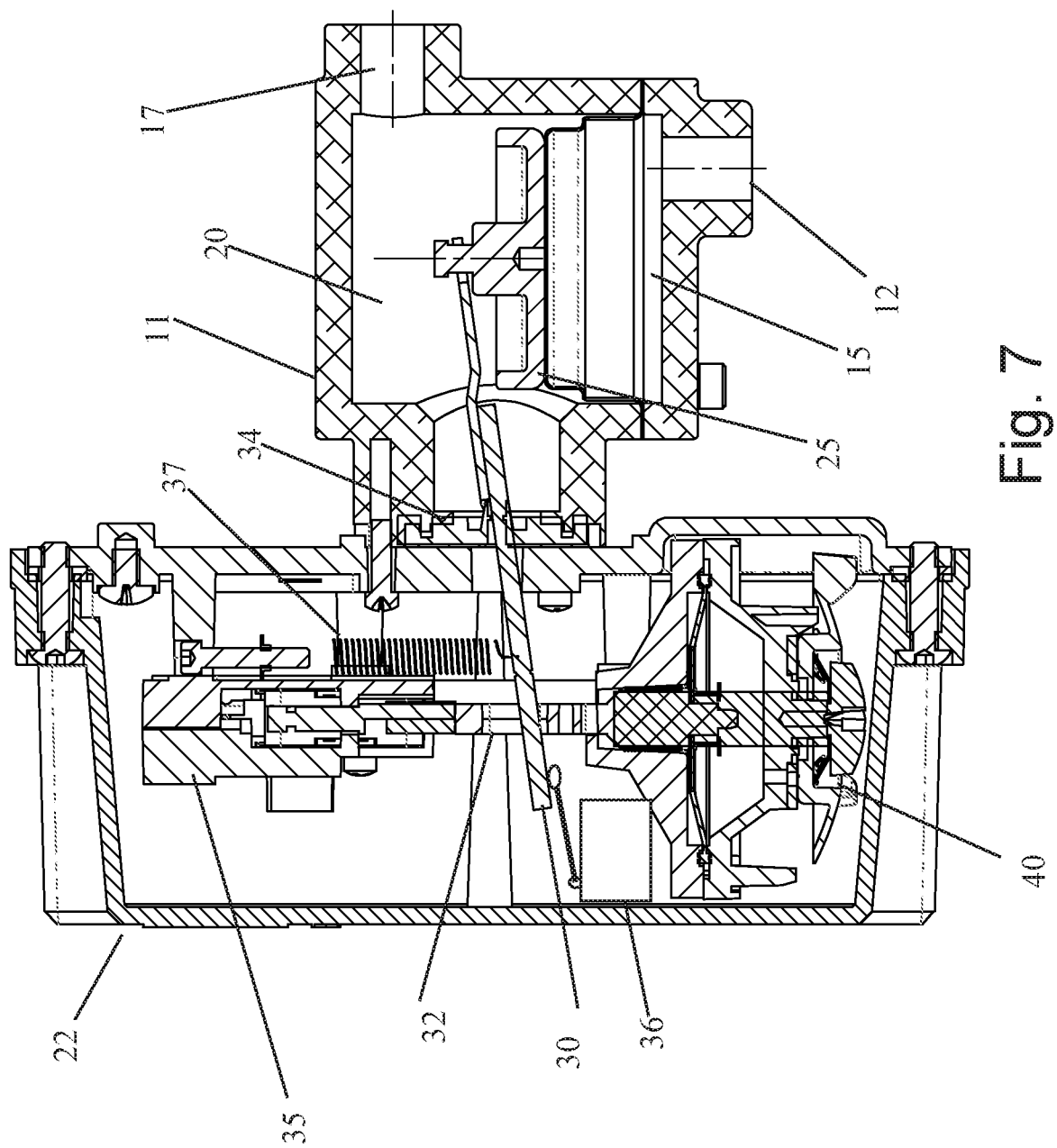
FIG. 7 depicts a cross-section of the flow detection device of FIG. 2 in active condition, when flow is detected across the valve.

FIG. 2 depicts an outside perspective view of one embodiment of a flow detector, and FIG. 3 depicts the flow detector in a typical installation with a valve. FIG. 5 depicts a cross-section of the flow detector embodiment of FIG. 2 in a standby state, i.e. with no flow detected, and FIG. 7 depicts a cross-section of the same detector while fluid flow through the valve is detected.

The flow detector 10 depicted in FIG. 2 has a detector housing 11 with a supply port 12 and a distribution port 17. The ports are named for clarity by the side of the system they couple to, namely while properly and operationally installed in a firefighting system, the supply port 12 is in fluid coupling with the supply side of the valve, while the distribution port 17 is in fluid coupling with the distribution system downstream from the valve. This naming should not be interpreted as mandating that the supply port must be coupled directly to the fluid supply such as mains supply and the like, but instead that the supply port is coupled to the system upstream from the distribution port and on the upstream side of the valve sealing port while the distribution port 17 is coupled to the system downstream from the valve sealing port. Thus by way of example, relating to FIG. 1A, the supply port 12 may be coupled to a port P1, with the distribution port 17 at P3 or, if the flow detection device 10 is sufficiently sensitive and/or the pressure drop through valve Bc is sufficiently large, to P2. Alternatively in the depicted example of FIG. 1A the supply port may be coupled to P1 for maximum pressure drop which is the sum of pressure drops on the local control valve BC and the check valve BNR. In FIGS. 3-7 supply port 12 is coupled to a point of substantial pressure equivalence to P2 and distribution port 17 to P3.

It is noted that the supply port and the distribution port may be coupled to other appropriate locations in the distribution system, where a pressure drop resulting from flow may be similarly sensed.

The device of FIG. 2 also has an electric housing 22 which may house certain sections of the detector, and serves as convenient location for electrical connections and equipment.

Figure 4:
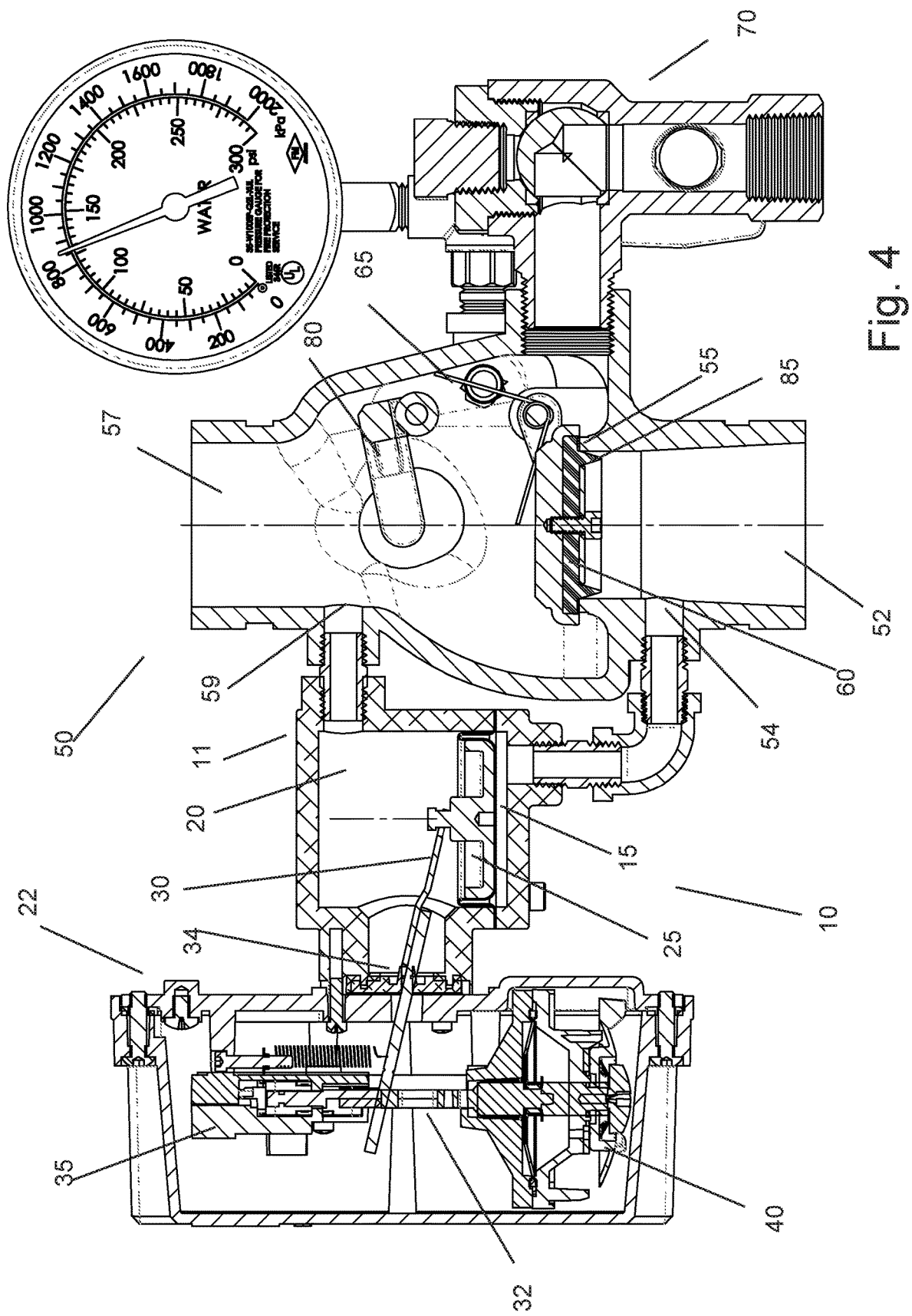
FIG. 4 depicts a cross-section of the valve and flow detector of FIG. 3 depicted in standby condition.
Figure 6:
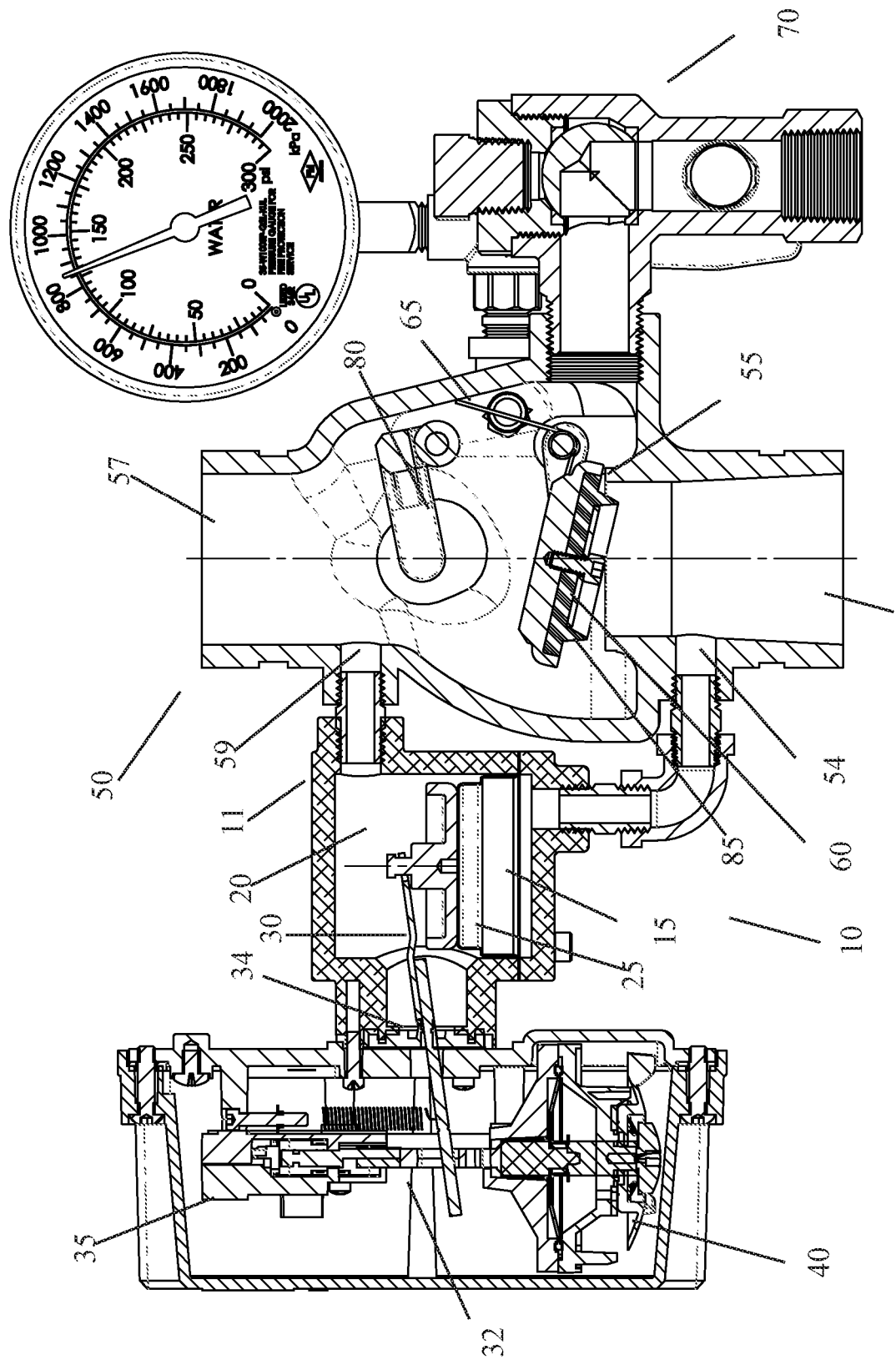
FIG. 6 depicts a cross-section of the valve and flow detector of FIG. 3 in active condition, when low-level flow is detected across the valve.

FIGS. 4 and 6 show a sample interconnection between the valve and the flow detector. In the depicted embodiment the valve 50 is equipped with an inlet sensing port 54 in fluid coupling with the valve inlet, and an outlet sensing port 59 which is in fluid coupling with the valve outlet. It is noted that the sensing ports do not have to be in the valve body and may be provided in the respective pressure location such as piping coupled to the valve inlet and outlet. Furthermore, in certain embodiment a plurality of valves are installed in series in a single manifold. By way of example such manifold may have a separate shutoff valve and a check valve, and the flow detector may be coupled to sensing ports to sense pressure drop across a single valve or both valves. Similarly, the sensing ports may be disposed in any of the valves or in pipes forming the manifold or portions thereof, or in any convenient combination as long as the inlet sensing port is upstream from at least one valve and the outlet sensing port.

The inlet sensing port 54 is in fluid coupling with the flow detector supply port 12 and the outlet sensing port is in fluid communication with the distribution port 17 of the flow detector 10.

FIG. 5 depicts a cross-section of the flow detector device in standby state. The detector device 10 has a detector housing 11 which defines a supply pressure chamber 15 in fluid communication with the supply port 12, and a distribution pressure chamber 20 in fluid communication with the distribution port 17. A pressure sensing member 25 separates the supply and distribution chambers, and is exposed on one side thereof to fluid pressure in the supply chamber and on the opposite side thereof to pressure in the distribution chamber.

The pressure sensing member may be embodied in several ways. In the FIGS. 5 and 7 it is depicted as a displaceable diaphragm 25 but it may be embodied in a piston or in a wall such as a separator containing a pressure transducer. In certain embodiments the separator may be flexible to better reflect the pressure from the respective chambers. Notably the pressure sensing member is responsive at least to the difference between the supply and distribution chambers. In certain embodiments it is also sensitive to the absolute pressure, to check general system pressure.

In the device depicted in FIGS. 4-7 the pressure sensing member is of the displacement type, embodied by a diaphragm or a piston is displaced towards the distribution chamber when the pressure in the supply chamber is larger than the pressure in the distribution chamber, and as explained above such pressure difference is indicative of fluid flow across the valve.

The movement of the pressure sensing member 25 in response to a pressure difference between the chambers is sensed. Sensing may be done in several ways, such as magnetically or electro magnetically, optically, acoustically, hydraulically, or, as depicted in FIGS. 4-7, mechanically, utilizing a lever, a pawl, a plunger, and the like.

Sensor lever 30 is coupled to the pressure sensing member 25 and extends across an appropriate seal 34 to the electrical housing 22. The electrical housing houses an indicator device which transforms the displacement of the pressure sensing member 25 to a flow indication, by asserting an electrical signal directly or indirectly. Most commonly the flow indication comprise changing the state of at least one switch 35. However other indications are explicitly considered. By way of example the indicator may provide an indication of the level of displacement, or assert the electrical signal via a wired or wireless data link, either digitally or in analog fashion such as by a given voltage or current, frequency, duty cycle, timing, phase, and the like.

The indicating device commonly acts to assert the electrical signal in response to a certain displacement of the pressure sensing member, thus the indicator device acts as a comparator which only asserts the signal if the displacement exceeds a certain range. As described supra such displacement corresponds to certain fluid flow level, commonly exceeded by the activation of even a single sprinkler downstream from the valve.

FIG. 6 depicts the valve and flow detector in a state where a relatively small flow passes across the valve 50. The partial rotation of the clapper 60 is clearly seen, and the skilled person would more clearly understand the added displacement caused by the optional clapper lip 85, which increases the pressure loss between the valve inlet and outlet chambers.

FIG. 7 depicts the flow detector under the influence of the pressure differential between the valve 50 inlet 52 and outlet 57 chambers, which are coupled to the supply 15 and distribution 20 pressure chambers respectively. The pressure differential displaces the diaphragm 25 which in turn rotates the lever 30. The lever 30 urges the plunger 32 to an asserted position. When the plunger is moved sufficiently, it causes a state change in switch 35, or otherwise asserts an electrical signal as described supra. Adjustment of the location of the switch, in combination with parameters such as the stiffness of the pressure sensing member 25, the ratio of portions of the lever 34 relative to the fulcrum, auxiliary levers, and the like may be utilized to adjust the level of pressure differential which will cause the flow detector to assert the electrical signal. Notably, adjustability is not required—the level may be set sufficiently small to assert the electrical signal in response to even relatively small differential, or indeed to any desired level.

Many firefighting systems, and most specifically those systems operating of public mains water, suffer from pressure fluctuations resulting from changes in water consumption, temperature variations, vibrations, 'water hammer' phenomena, and the like. In order to prevent such momentary fluctuations from causing false alarms, it is common although optional, to delay the activation of any alarm for a predetermined delay period. Optionally a delay mechanism 40 is implemented to cause the electrical signal to be asserted only if the flow indication persists beyond a predetermined period. In the embodiment of FIGS. 4-7 the lever 30 is coupled to the plunger by a spring 37, and the movement of the lever in response to pressure differential urges the plunger to activate. However the delay mechanism 40 limits the plunger movement over time, and allows it to arrive at a position where the switch alters its state only after a prescribed time. If the pressure differential is merely transient the lever would stop urging the plunger to and the electrical signal would not be asserted. The depicted delay mechanism is pneumatic-mechanical where the pressure by the plunger causes air to pass through an orifice. Optionally the orifice size is controllable thus allowing adjustability of the period from detection of the pressure differential until the electrical signal is asserted, such as by changing the switch 35 state. In some embodiments momentary release of the pressure differential resets the delay mechanism.

Other appropriate delay mechanisms 40 such as viscose, hydraulic, mechanical, electrical, electro-thermal, magnetic and/or electronic by way of example, may be utilized alone or in combination to delay the assertion of the electrical signal.

FIG. 7 also depicts an optional feature—If the fluid flow across valve 50 exceeds a certain, second, level higher than the flow that may be caused by a single sprinkler firing, it may be assumed that a larger fire occurred and thus call for change of the alert settings or the activation of other measures. By way of example if the flow is caused by activation of several sprinklers, clearly even the delay intended to mitigate transient pressure effects may be damaging, and thus the delay may be bypassed. To that end, in some optional embodiments a second level of fluid flow may be set, and upon detection of that second level of fluid flow (which is higher than the first fluid flow) is reached, the flow detector may assert a second electrical signal, or in systems which utilize delay mechanism such as mechanism 40 may bypass the delay. The second level of flow may be any desired level, such as the flow rate created by two, three and more sprinklers being activated, however commonly such number would not exceed more than 5% of the total number of sprinkler attached downstream from the valve. By way of example of a second flow level signal activation, FIG. 7 depicts a second switch 36 which is activated by the lever 30 in response to pressure difference exceeding the first level, and/or reaching or exceeding the second level. In non-delayed embodiments the second switch 36 asserts a second electrical signal separate from the first, indicating a larger fire detection, while in systems which utilize a delay the second switch 36 may be connected in parallel to switch 35 and thus assert the same electrical signal while bypassing the delay mechanism 40, or switch 36 may assert a different electrical signal. It will be clear to the skilled in the art that in order to measure relative flow levels, such as even the first flow level, the pressure sensing member should have a certain force acting against the pressure differential.

Figure 8:
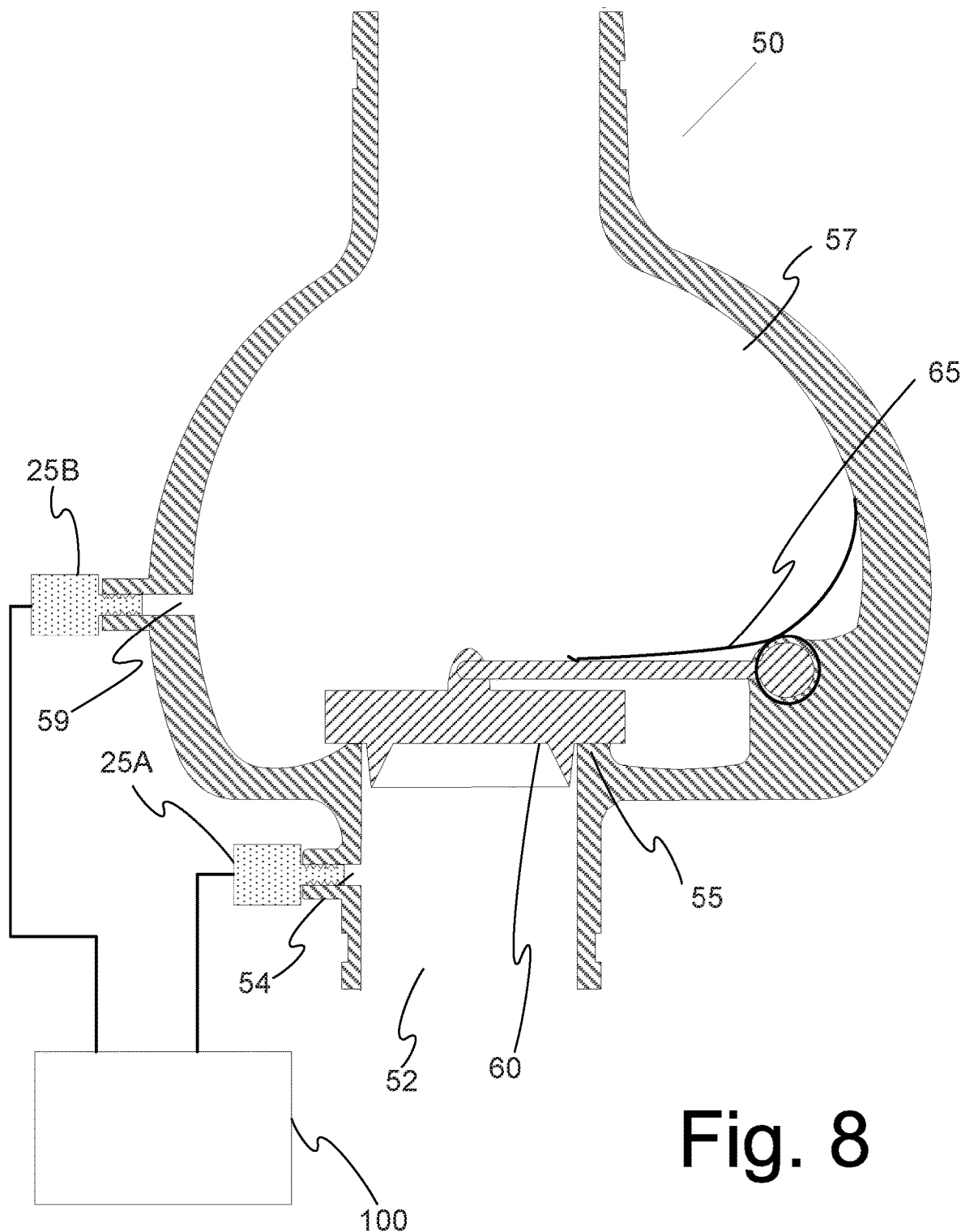
FIG. 8 depicts schematically an embodiment utilizing separate pressure sensors on the inlet and outlet of the valves.

FIG. 8 depicts schematically a different embodiment of a flow switch and valve combination wherein the pressure sensing member 25 comprises two individual pressure transducers 25A and 25B. Transducer 25A is exposed to the supply pressure present in the inlet chamber 54 of valve 50 and transducer 25B is exposed to the distribution pressure present in the outlet chamber of valve 50. While the valve hydrodynamics for the flow stemming from a sprinkler activation is similar, the flow detection occurs by direct measurements of the separate pressures downstream and upstream from the valve sealing port, and the determination of the flow level takes place electronically.

Pressure transducers 25A and 25B may be of any appropriate type. By way of example, pressure transducers of resistive, capacitive, piezoelectric, vibrating wire, thin film and other types of strain gage technology, in any common configuration such as bridge, series, parallel, excited, or passive type are all known in the art. The pressure transducers may communicate the sensed pressure in any desired analog or digital communication method. By way of example variable voltage, variable current (such as 4-20 mA loop), variable frequency, phase shift, variable duty cycle and the like are examples of common of analog transmission methods, however the transducers may perform an analog to digital (A/D) conversion locally and transmit the resulting pressure digitally by wired or wireless links, either on point to point or by multi-access networks allowing a plurality of sensors to utilize a common communication link.

Figure 9:
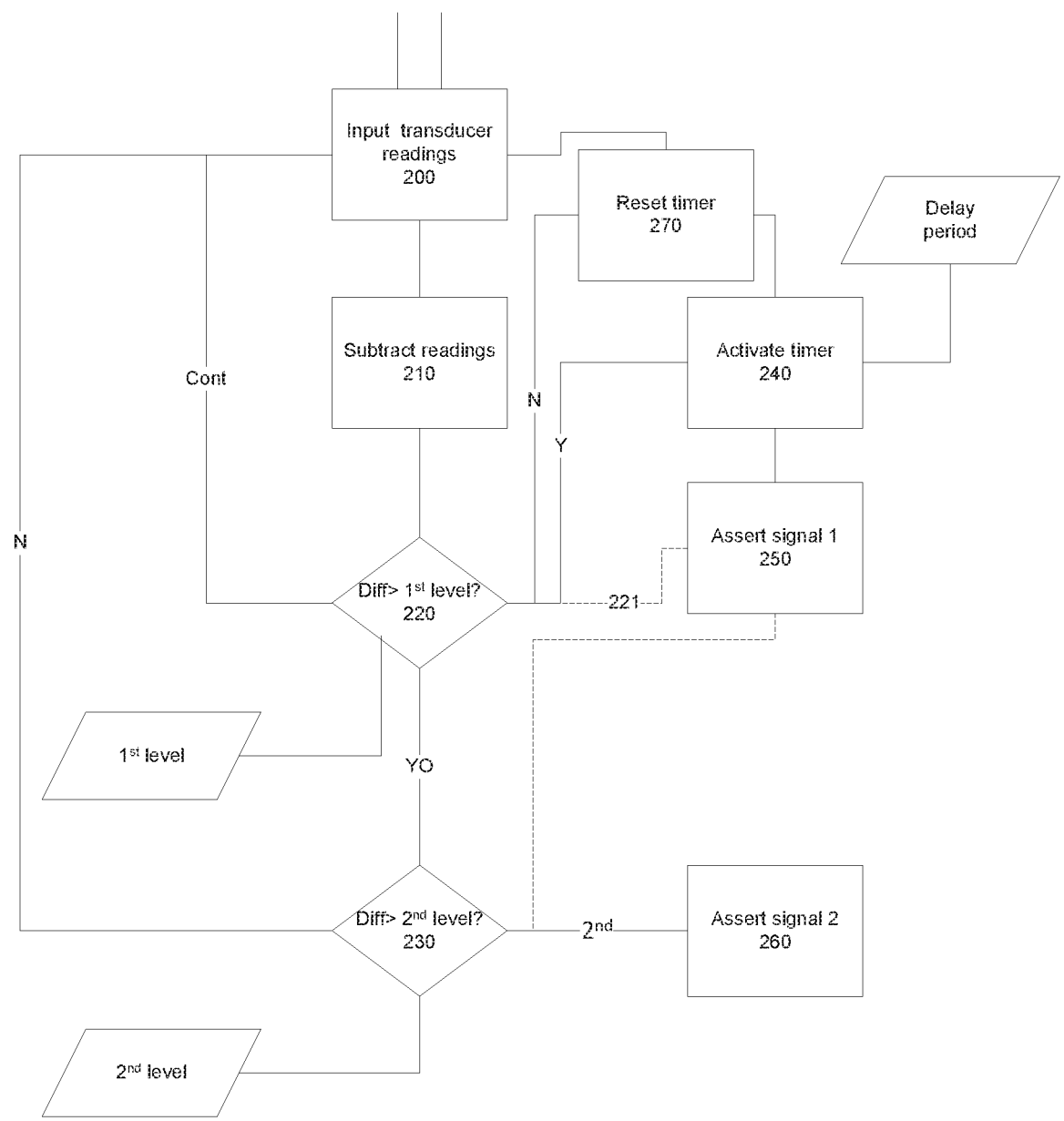
FIG. 9 depicts a simplified flow diagram of a process, implemented by circuitry or logic or a combination, of process for asserting one or more electrical signals in response to fluid flow.

The logic 100 contains subtraction circuitry to receive the readings of the two transducers 25 A and 25B, and logic to perform at least the process depicted in a simplified flow diagram in FIG. 9. The logic may comprise discrete or integrated electronics and/or a processor or application specific circuitry. The logic circuitry may be digital, analog or a combination thereof.

As shown in FIG. 9 the process begins by inputting the transducer readings 200 from both the distribution 25B and supply 25A transducers. This step also performs any required preprocessing, such as communications related processing, analog to digital conversion, interpretation, normalization, signal shaping, noise removal, compensation, and the like. In two sensor system the logic then subtracts the resultant readings 210 to obtain a pressure difference between the supply and distribution readings. If a differential pressure sensor is utilized, step 210 may be superfluous. The resulting pressure difference is than compared against a first predetermined level 220. This first predetermined level may be obtained computationally or empirically, or otherwise set according to system design requirements. In most embodiments the first level corresponds to the pressure drop across the valve which is caused by fluid flow slightly lower than the flow expected from triggering of a single sprinkler downstream of the valve. Setting this first predetermined value to that level provides asserting the electrical signal for even such single sprinkler activation, and thus provides early warning of a fire.

If the pressure difference across the valve is equal to or larger than the first level, the system follows the Y path from the decision 220, and in the depicted embodiment, and activates a timer 240. In certain embodiments without a timer the path would lead directly to asserting the first electrical signal 250 as indicated by the dashed line 221. However, as explained earlier a delay is desired in most embodiments to deal with pressure fluctuation such as water hammer and the like, and thus a timer is commonly desired. If used, the timer delays the assertion of the first electrical signal 250 for a delay period.

If the pressure difference is smaller than the first level thee system follows the path marked N from the decision 220, and resets the timer 240, which will only restart after the process follows the Y path as explained above.

Regardless of the operation on the timer, processing continues in a loop in the path marked Cont to obtain new transducer readings 200, obtain a difference 210, and compare 220, and so forth.

Optionally, the system may be constructed to respond to a second level of fluid flow. Such second level may be obtained similarly to the way the first level, and generally corresponds to fluid flow from two or more sprinklers being activated. Such occurrence indicates that the fire gained in dimension, and thus an early alarm, or a different type of alarm is desired. By way of example such second alarm may be delivered to firefighters as an indication of the severity of the fire, so that larger resources are allocated to fight it. FIG. 9 depicts one exemplary embodiment, when the system continues after decision 220 in the path marked YO to compare the pressure difference between the two transducers with the second level. If this difference is smaller no action is taken, (path N from 230, to step 200) however if the difference is indeed equal or greater, either the path 2nd is followed and a second electrical signal is asserted 260, or as indicated by the dashed path the first electrical signal is asserted 250 bypassing the timer, or both actions may be performed.

Commonly at least the delay period is adjustable, and the first and second levels are set for each installation, but the levels may be adjustable as well. Most specifically, the second level is set sufficiently high to avoid the second alarm being triggered needlessly such as due to pressure fluctuations specific to the firefighting system installation or a portion thereof. A properly calibrated test and drain valve may be utilized.

It is noted that with any embodiment of the invention where pressure and/or pressure differential is measured, raw information thereof may be transmitted, displayed, and/or logged.

Asserting the first and/or the second electrical signals may be achieved by any desired manner. Such assertion may occur as a simple state change of an indicator or a switch, by sending information of the assertion to another location, in digital or analog form. The signal may be utilized to activate an alarm, to alert personnel of a fire, to communicate the fire detection to one or more fire department, to communicate the detection by any desired manner, to activate other firefighting systems, to control access to certain areas, and the like.

While careful calibration should be maintained in each of those constructs, if pressure switches are utilized for pressure transducers 25A and 25B, extra care should be exercised to properly calibrate the two pressure switches relative to each other as both switches operate at high operating pressure yet will be required to cause the alarm with precision at a relatively small pressure difference therebetween, yet the differential is important for proper system operation.

It is noted that the pressure transducers 25A and 25B may be replaced by a single differential transducer having two ports and adapted to measure the pressure the difference between the two ports, where one port is exposed to the supply pressure in the input chamber 52 and the other port of the differential transducer is exposed to the distribution pressure, and the differential pressure transducer measures the pressure differential therebetween. In such case the logic does not to subtract the two readings (step 210 of FIG. 9) as it receives a single reading representing that difference.

Figure 10:
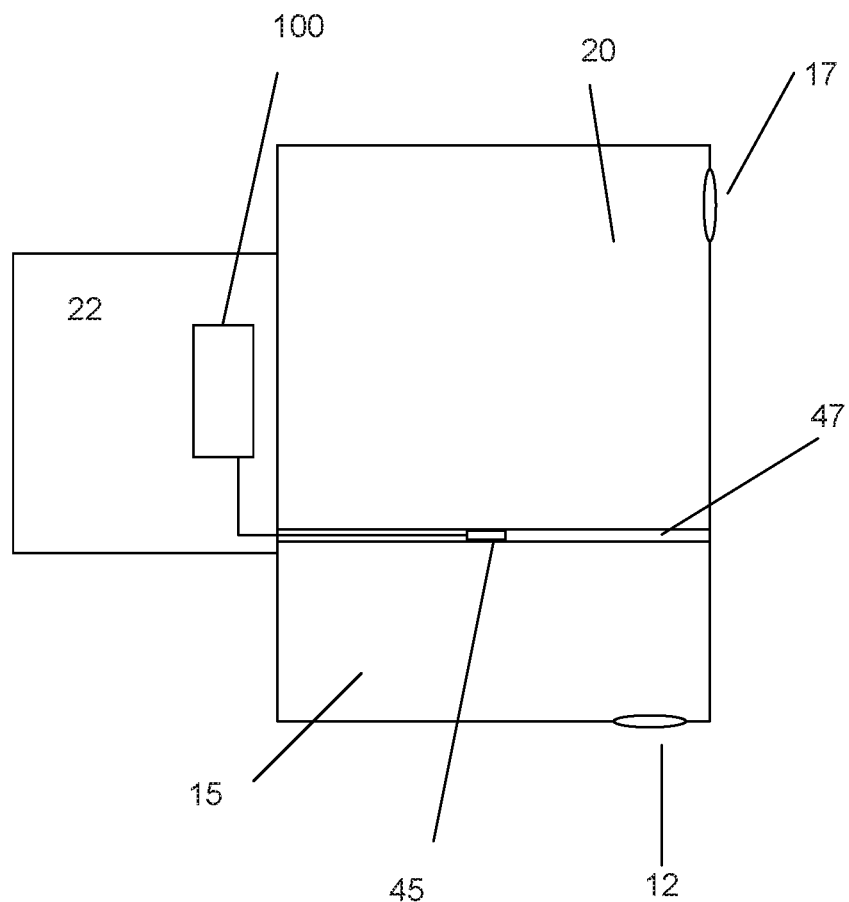
FIG. 10 depicts a simplified cross-section of yet another embodiment of a flow detector.

FIG. 10 presents an example of such embodiment for the fluid flow sensor. In general, a differential pressure sensor is coupled to the supply and distribution of the valve, and the output is utilized with logic similar to the logic shown in FIG. 9, except that as the pressure read from the sensor is already a differential reading, the step 210 is superfluous. The embodiment shown in FIG. 10 is but one example of a differential pressure embodiment, and comprises a distribution 20 and supply 15 pressure chambers coupled respectively to the distribution and supply sides of the valves 50. The chambers 15, 20 in such embodiment are oftentimes extremely small to minimize pressure loads. The supply and distribution chambers are separated at least by a pressure transducer 45 exposed on one side to the supply chamber pressure and to the distribution chamber on the other side, such that its output represents the pressure differential therebetween. As in any other pressure transducer disclosed in this application, any known technology transducer may be utilized. Oftentimes driving and/or enabling circuitry appropriate for the transducer type is required, and such is provided and considered as a part of the logic 100.

In certain embodiments the pressure transducer 45 may be embedded in a membrane. The pressure transducer may be of any technology and in contact with the respective pressure chambers, or it may be encased between two membranes which serve to transmit the pressure of their respective chambers to the sensor. At times the transducer is exposed to high pressure especially when only one of the opposing chambers is pressurized. While certain types of transducers, such as a vibrating wire sensor embedded on a membrane, may be able to withstand such pressures, other transducers may require additional protection, from excessive pressure and/or from contact with the firefighting fluid. To that end, in some embodiments, the pressure transducer is disposed in a pressure chamber formed by the two membranes, and as the respective membrane flexes it transmits the pressure to the transducer. Such construction provides Inter alia for isolation of the pressure transducer from direct contact with the measured fluid and allow two membranes to bear high pressure difference between the two pressure chambers.

Certain transducer may provide direct sensing of pressure exceeding a given level by providing switching actions. Such a pressure sensitive switch may be economical and simplify the required logic. In embodiments where a delay is desired the transducer switching may activate the timer.

Figure 11:
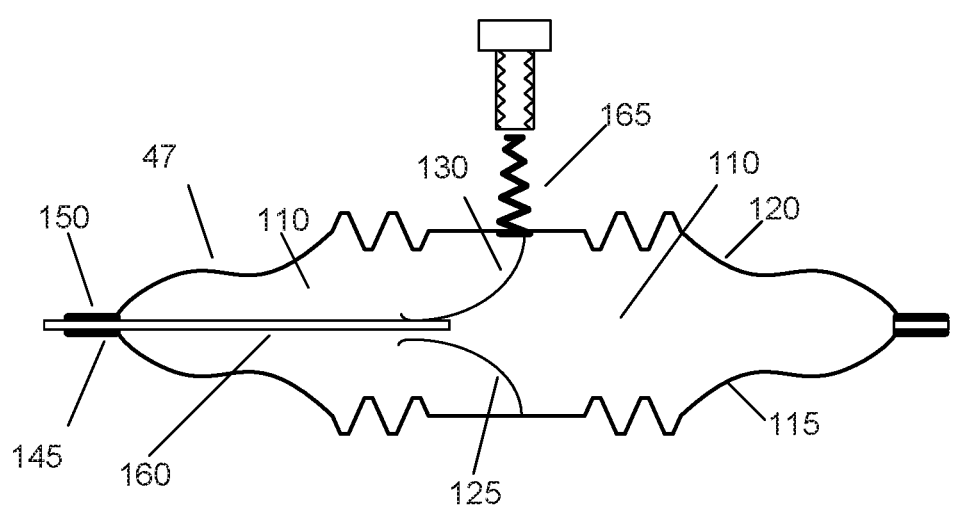
FIG. 11 depicts an optional aspect showing a cross-section of differential pressure switch.

FIG. 11 depicts cross-section of an optional membrane 47 capable of switching type detection. The membrane 47 is disposed as shown in FIG. 10. The membrane forms an intermediate chamber 110 composed of a first resilient diaphragm 115 facing the supply chamber 15 coupled to a second resilient diaphragm 120 disposed opposite the first diaphragm and exposed to the distribution chamber 20. The two resilient diaphragms form the intermediate chamber 110 therebetween, which preferably is filled with non-compressible, non-conductive fluid. At least one contact 125 is disposed inside the intermediate chamber on diaphragm 115. The contact is disposed to be normally open such that when the pressure is equal on both sides of membrane 47 the contact 125 does not touch the center conductor 160, but is at some distance therefrom. When the diaphragm 115 is exposed to higher pressure than the diaphragm 120, it deforms and the contact 125 comes into contact with center contact 160, thus closing a circuit. If filled with non-compressible fluid the disclosed construction structure provide high structural strength so as to allow the membrane to withstand the pressure imparted thereupon even when one side thereof is exposed to full operating static pressure while the other side is not pressurized, as may happened during maintenance by way of example. Thus a strong yet sensitive differential pressure switching sensor is achieved.

Optionally a second contact 130 is coupled to resilient diaphragm 120 in a normally closed disposition, i.e. being in contact with the center contact 160 when the pressure on both sides of membrane 47 are equal. Dimensioned properly to disconnect from the center contact under pressure differential between the membrane sides, can provide a system assurance test, and in embodiments where a second electrical signal is to be asserted responsive to higher flow a resilient contact 130 may be utilized as the sensor for the second signal. Varying the level at which the first electrical signal is asserted may be done by preloading the distribution chamber side of the membrane 47 such as by a variable spring 165. The second level, if utilized is determined by the disposition of contact 130.

As mentioned above, check valves tend to exhibit sharper pressure drop at relatively low flow rate as the fluid must act against the clapper and often also against a spring, however any valve with sufficient pressure drop such that the differential may be sensed a flow switch in the required operating environment of a firefighting system may be utilized.

Thus, different embodiments of the flow sensor in accordance with the teachings of the present invention provide the advantage of minimum impact to fluid flow resistance in the system.

It is noted that due to the removal of the sensing element from the actual flow and utilizing pressure drop about a valve the system provides the advantage of allowing a single mechanism to operate on various pipe sizes. Furthermore, adjusting flow detector parameters offer variable sensitivity thus easing customization for varying operating environments.

Numerous specific details are set forth such as examples of specific components, devices, and methods, to provide a thorough understanding of embodiments of the present invention. It will be apparent to those skilled in the art that specific details need not be employed, that example embodiments may be embodied in many different forms and that neither should be construed to limit the scope of the disclosure. By way of example an immediate switch coupled to electronic delay may be utilized in embodiments described as utilizing mechanical delay, electronic pressure sensors may be used in combination with mechanical sensors, and the like. The terminology used herein is for the purpose of describing particular example embodiments only and is not intended to be limiting. As used herein, the singular forms "a," "an," and "the" may be intended to include the plural forms as well, unless the context clearly indicates otherwise. The disclosed embodiments do not preclude additional features, and are intended as illustrative examples, rather than as limiting details. When an element is referred to as being "coupled to" another element, it may be directly on, engaged, connected or coupled to the other element directly or by intervening elements unless the term 'directly coupled' is used, where no intervening elements are present. As used herein, the term "and/or" includes any and all combinations of one or more of the associated listed items. The term 'fluid communication" implies that fluid may flow between the two elements being in such communication, either directly or via a pipe, duct, conduit, valve, and the like, and does not require similar cross-section therebetween. Commonly such communication also exposes the two coupled devices in such communications to similar pressures, especially when the fluid is non-compressible.

Although the terms first, second, third, etc. may be used herein to describe various elements, components, regions, layers and/or sections, such designations are only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed above could be equivalently termed a second element, component, region, layer or section without departing from the teachings of the example embodiments. Spatially relative terms, such as "inner," "outer," "beneath," "below," "lower," "above," "upper," and the like, may be used herein for ease of description to describe one element or feature's relationship to another element(s) or feature(s) as illustrated in the figures, or in or relative to a specified orientation of an embodiment or a portion thereof. Spatially relative terms may be intended to encompass different orientations of the device in use or operation in addition to the orientation depicted in the figures. For example, if a first element is described as being "beneath" other elements or features than the other elements or features would be "above" the first element in the described orientation, but if the device is otherwise oriented the spatially relative descriptors used herein should be interpreted with respect to such orientation. Thus by way of example the term 'upper side' of the prelate to side of the closure member 355 of the actuator facing the accelerator pilot chamber 350, while the 'lower side, relate to opposite side, which serves in the embodiment in the depicted drawings as a seal to the vent port.

It will be appreciated that the invention is not limited to what has been described hereinabove merely by way of example. While there have been described what are at present considered to be the preferred embodiments of this invention, it will be obvious to those skilled in the art that various other embodiments, changes, and modifications may be made therein without departing from the spirit or scope of this invention and that it is, therefore, aimed to cover all such changes and modifications as fall within the true spirit and scope of the invention, for which letters patent is applied.

The invention claimed is:

1. A flow detection device for detecting flow in a firefighting system having at least one valve, the valve having a body, an inlet for coupling to a fluid supply, an outlet for coupling to a fluid distribution system, a fluid path defined in the body between the inlet and the outlet, the device further comprising:
   a sealing element disposed in the fluid path, for controlling fluid flow between the inlet and outlet, the sealing member dividing the fluid path into an input chamber and an output chamber;
   a supply pressure chamber in fluid coupling with the inlet chamber;
   a distribution pressure chamber in fluid coupling with the outlet chamber;
   a pressure sensing member coupled to the supply and distribution pressure chambers, and operative to sense pressure differential therebetween; and,
   an indication device coupled to the pressure sensing member and operative to provide an indication when a pressure differential between the supply and distribution pressure chambers exceeds a first predetermined level.

2. The flow detection device as claimed in claim 1, wherein the first predetermined flow level commensurate with flow associated with an activated firefighting sprinkler.

3. The flow detection device as claimed in claim 1, wherein the indication device is operative to assert an electrical signal in response to the pressure differential exceeding the first predetermined level, and not assert the signal if the pressure differential does not exceed the predetermined level.

4. The flow detection device as claimed in claim 1, further comprising a delay mechanism operative to provide the indication only if the pressure differential exceeds the first predetermined level for a predetermined delay period.

5. The flow detection device as claimed in claim 4, wherein the predetermined delay period and/or the first predetermined level are adjustable.

6. The flow detection device as claimed in claim 3, further comprises a delay mechanism operative to assert the electrical signal only if the pressure differential exceeds the first predetermined level for a predetermined delay period.

7. The flow detection device as claimed in claim 6, wherein the predetermined period and/or the first predetermined level are adjustable.

8. The flow detection device as claimed in claim 3, wherein the indication device is operative to assert the electrical signal prior to the expiration of the predetermined period, and/or assert a second electrical signal, if the pressure differential exceeds a second flow level, higher than the first predetermined flow level.

9. The flow detection device as claimed in claim 8, wherein the first predetermined flow level commensurate with flow associated with an activated firefighting sprinkler, and the second predetermined flow level commensurate with flow associated with a plurality of activated firefighting sprinklers.

10. The flow detection device as claimed in claim 8, wherein the indication device is configured to assert the electrical signal immediately upon detection of flow level exceeding the second flow level.

11. The flow detection device as claimed in claim 1, wherein the pressure sensitive member comprises a piston or a diaphragm disposed such that a first side thereof is exposed to the supply pressure chamber, and a second side, opposite the first side, is exposed to distribution pressure chamber.

12. The flow detection device as claimed in claim 11, wherein movement of the piston or diaphragm are related to the pressure differential and wherein the amplitude of the movement is indicative of the pressure differential.

13. The flow detection device as claimed in claim 1, wherein the pressure sensing member comprises a differential pressure transducer having a first and second sensing surfaces, the pressure transducer being disposed such that the first sensing surface is exposed to pressure in the valve inlet, and a the second sensing surface being exposed to the pressure in the valve outlet.

14. The flow detection device as claimed in claim 13, wherein the differential pressure transducer comprises a first and a second electronic transducers, the first sensing surface being in the first transducer and the second sensing surface being in the second electronic transducer, the indicating device being configured to measure a difference between the sensing of the first and second transducers.

15. The flow detection device as claimed in claim 13, wherein the pressure transducer is further configured to assert a third electrical signal if the pressure at the valve input and/or the valve output falls below a predetermined level.

16. The flow detection device as claimed in claim 1, wherein the valve is a check valve.

17. The flow detection device as claimed in claim 16, further comprising a seat disposed between the inlet and the outlet, and a clapper rotatably disposed between a closed position where the clapper acts as the sealing element sealing against the seat, and an open position where the clapper is rotated away from the closed position.

18. The flow detection device as claimed in claim 17 wherein the clapper further comprises a lip extending into the seat towards the valve inlet when the check valve is in the closed position.

19. The flow detection device as claimed in claim 1, wherein the valve comprises a plurality of valves coupled in series to one another, wherein the valve supply pressure is the pressure at the inlet of the upstream-most valve, and the distribution pressure is the pressure at the outlet of the downstream-most valve.

* * * * *